(12) United States Patent
Son

(10) Patent No.: US 11,613,300 B2
(45) Date of Patent: Mar. 28, 2023

(54) STEERING APPARATUS

(71) Applicant: HYUNDAI MOBIS CO., LTD., Seoul (KR)

(72) Inventor: Chang Wook Son, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 92 days.

(21) Appl. No.: 17/107,515

(22) Filed: Nov. 30, 2020

(65) Prior Publication Data

US 2021/0163059 A1    Jun. 3, 2021

(30) Foreign Application Priority Data

Dec. 3, 2019   (KR) .................. 10-2019-0158746

(51) Int. Cl.
*F16H 55/28*    (2006.01)
*B62D 3/12*     (2006.01)
*F16H 19/04*    (2006.01)

(52) U.S. Cl.
CPC ............. *B62D 3/123* (2013.01); *F16H 19/04* (2013.01); *F16H 55/283* (2013.01); *F16H 2019/046* (2013.01)

(58) Field of Classification Search
CPC ......... F16H 55/283; B62D 3/126; B62D 3/12; B62D 3/123
See application file for complete search history.

(56) References Cited

U.S. PATENT DOCUMENTS

| 4,691,583 | A * | 9/1987 | Taig ...................... F16H 55/283 74/498 |
| 8,899,119 | B2 * | 12/2014 | Bareis .................. B62D 3/123 74/89.17 |
| 9,435,420 | B2 * | 9/2016 | Kim ...................... F16H 55/283 |
| 9,527,522 | B2 * | 12/2016 | Kim ........................ F16H 57/12 |
| 9,630,646 | B2 * | 4/2017 | Lucchi .................. F16H 55/283 |
| 2008/0006110 | A1 * | 1/2008 | Douma .................. B62D 3/123 74/422 |
| 2008/0006111 | A1 * | 1/2008 | Douma ................. F16H 55/283 74/422 |
| 2008/0190229 | A1 * | 8/2008 | Dodak ..................... B62D 3/12 74/388 PS |
| 2010/0018337 | A1 * | 1/2010 | Kawakubo ............ F16H 55/283 267/277 |
| 2014/0260719 | A1 * | 9/2014 | Bae ....................... F16H 55/283 74/30 |
| 2015/0020619 | A1 * | 1/2015 | Son ........................ B62D 3/123 74/30 |

FOREIGN PATENT DOCUMENTS

KR    10-2015-0022572    3/2015

\* cited by examiner

*Primary Examiner* — William C Joyce
*Assistant Examiner* — Gregory Robert Weber
(74) *Attorney, Agent, or Firm* — H.C. Park & Associates, PLC

(57) ABSTRACT

Disclosed is a steering apparatus including: a mounting housing which is formed on one side of a rack housing and has first threads formed on an inner circumferential surface thereof; a yoke body which is provided inside the mounting housing and supports a rack bar located inside the rack housing; and a pressing member which is provided inside the mounting housing, has second threads formed on an outer circumferential surface thereof, and is coupled to the mounting housing in a state in which the second threads are coupled to the first threads and are separated from the yoke body.

11 Claims, 8 Drawing Sheets

STEERING APPARATUS

CROSS-REFERENCE TO RELATED APPLICATION

This application claims priority from and the benefit of Korean Patent Application No. 10-2019-0158746, filed on Dec. 3, 2019, which is hereby incorporated by reference for all purposes as if set forth herein.

BACKGROUND

Field

Exemplary embodiments of the present disclosure relate to a steering apparatus, and more particularly, to a steering apparatus that can reduce a process time by reducing the number of components to be used, and easily adjust a clearance.

Discussion of the Background

In general, a steering system provided to change a traveling direction of a vehicle includes a steering wheel provided on a driver seat of the vehicle, a pinion shaft connected to the steering wheel, a gearbox disposed to intersect the pinion shaft, and so on, and a rack bar moving in an axial direction is provided in a rack housing that forms the gearbox.

Examples of the steering system include a motor driven power steering system, a hydraulic power steering system, a rack assist motor driven power steering system (R-MDPS), and so on.

However, the conventional steering system has a problem in that lots of components are used to cause a complicated assembly process, and a long time is required for the process.

The background art of the present disclosure is disclosed in Korean Patent Application Laid-Open No. 10-2015-0022572 (published on Mar. 4, 2015, and entitled "CLEARANCE COMPENSATOR OF YOKE").

The above information disclosed in this Background section is only for enhancement of understanding of the background of the invention and, therefore, it may contain information that does not constitute prior art.

SUMMARY

Exemplary embodiments of the present disclosure were made to solve the above problem, and are directed to providing a steering apparatus capable of reducing a process time by reducing the number of components to be used, and easily adjusting a clearance.

In an embodiment, a steering apparatus includes: a mounting housing which is formed on one side of a rack housing and has first threads formed on an inner circumferential surface thereof; a yoke body which is provided inside the mounting housing and supports a rack bar located inside the rack housing; and a pressing member which is provided inside the mounting housing, has second threads formed on an outer circumferential surface thereof, and is coupled to the mounting housing in a state in which the second threads are coupled to the first threads and are separated from the yoke body.

In an embodiment, an opening may be formed at one side of the mounting housing, and the pressing member may be located to be exposed from the inside of the mounting housing to the outside thereof through the opening.

In an embodiment, a torsion spring may be provided at a center of an upper end of the pressing member so as to apply a rotational force to the pressing member.

In an embodiment, a seat may be formed at the center of the upper end of the pressing member such that the torsion spring is seated on the seat.

In an embodiment, a fixture may be formed on the seat such that one end of the torsion spring is fitted into and fixed to the fixture.

In an embodiment, fitting recesses may be formed in the mounting housing such that the other end of the torsion spring is fitted into and fixed to the fitting recess along a circumference of the mounting housing.

In an embodiment, each of the fitting recesses may include: an entry section which is formed in a longitudinal direction of the mounting housing, and into which the other end of the torsion spring is fitted and moved; and a fitting section which is bent to extend from the entry section in a direction in which an elastic force of the torsion spring is applied, and into which the other end of the torsion spring is fitted and fixed.

In an embodiment, a cap member may be coupled to the mounting housing so as to close the opening.

In an embodiment, a cap member fitting groove may be formed along an outer circumferential surface of the mounting housing, and a fitting protrusion may be formed on an inner circumferential surface of the cap member so as to be fitted into the cap member fitting groove when the cap member is coupled to the mounting housing.

In an embodiment, a clearance adjusting member, which moves toward or away from the pressing member and adjusts a clearance from the pressing member, may be provided between the pressing member and the yoke body.

In an embodiment, the clearance adjusting member may include: a movable section which is located apart from the yoke body and moves toward or away from the pressing member; and a body section which is formed integrally with the movable section, is rotatably coupled to the pressing member in a state in which the body section passes through the pressing member, and causes the movable section to move toward or away from the pressing member while rotating.

In an embodiment, a portion where an outer circumferential surface of the body section which is opposite to the movable section meets one surface of the pressing member may be caulked.

In an embodiment, a nut may be coupled to one side of the body section, which is opposite to the movable section, such that the clearance adjusting member is fixed to the pressing member.

In an embodiment, a disc spring may be provided between the pressing member and the clearance adjusting member.

As described above, the steering apparatus according to the present disclosure has an effect of cutting down whole manufacturing cost by reducing the number of components used in the steering apparatus.

Further, the first threads are formed on the inner circumferential surface of the mounting housing, and the second threads are formed on the outer circumferential surface of the pressing member. The pressing member is coupled through coupling between the first threads and the second threads. Thereby, there is an effect of cutting down whole manufacturing cost by reducing the number of components to be used.

Further, the first threads are formed on the inner circumferential surface of the mounting housing, and the second threads are formed on the outer circumferential surface of the pressing member. The pressing member is moved through coupling between the threads.

Thereby, there is an effect in which a clearance is easily adjusted.

Further, the first threads are formed on the inner circumferential surface of the mounting housing, and the second threads are formed on the outer circumferential surface of the pressing member. The pressing member can be moved through coupling between the threads. Thereby, it is possible to compensate for a clearance caused due to wear after endurance.

Further, the clearance adjusting member is provided to adjust a clearance through movement of the clearance adjusting member. Thereby, there is an effect of reducing an accumulated tolerance that may be caused while constituent components are assembled.

Further, a seating space is formed in the pressing member, and the fixture is formed in the seating space. Thereby, there is an effect of stably providing a rotational force to the pressing member in a state in which the torsion spring is fixed to the fixture.

Further, the fitting recess is formed in the mounting housing, and the torsion spring is fitted into and fixed to the fitting recess. Thereby, there is an effect in which an elastic force of the torsion spring is stably applied to the pressing member.

Further, the cap member is fitted into the mounting housing. Thereby, there is an effect of preventing external foreign materials from being introduced into the mounting housing.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
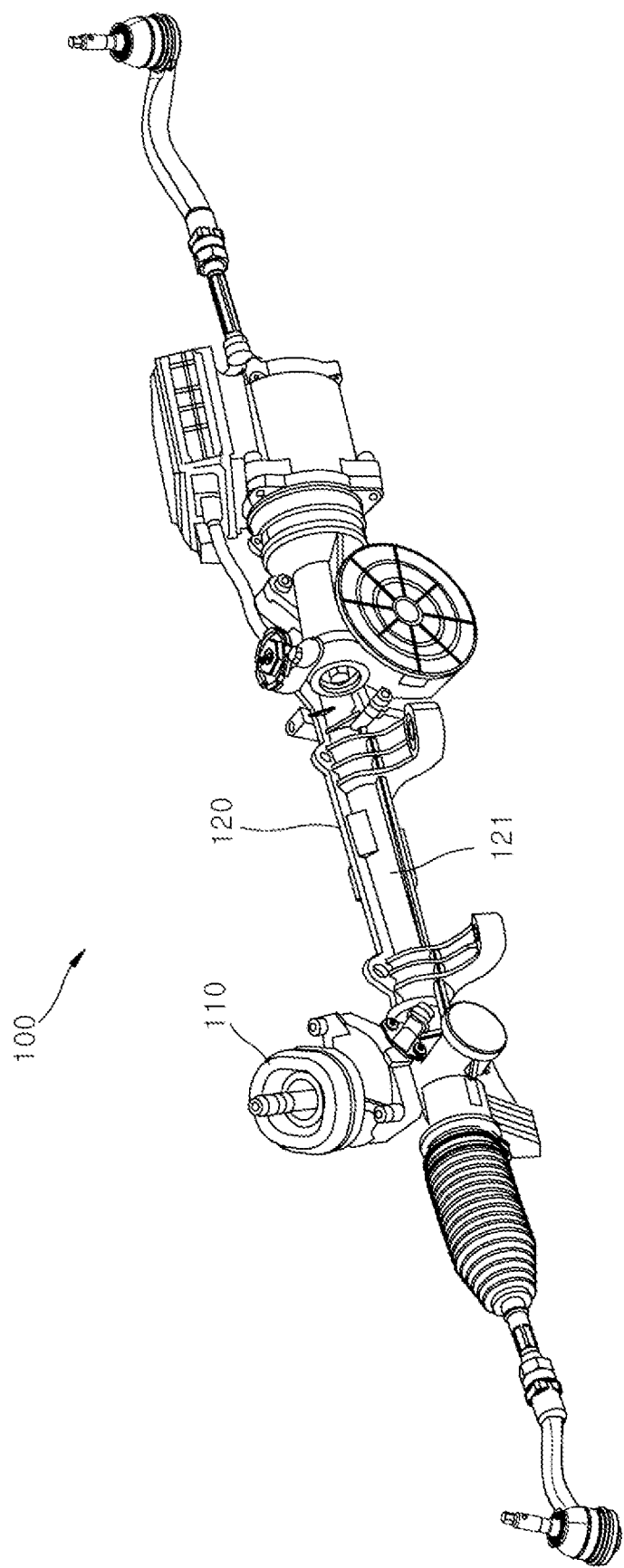
FIG. 1 is a perspective view illustrating a steering apparatus according to an embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Hereinafter, a steering apparatus according to an embodiment of the present disclosure will be described in detail with reference to the accompanying drawings.

Figure 2:
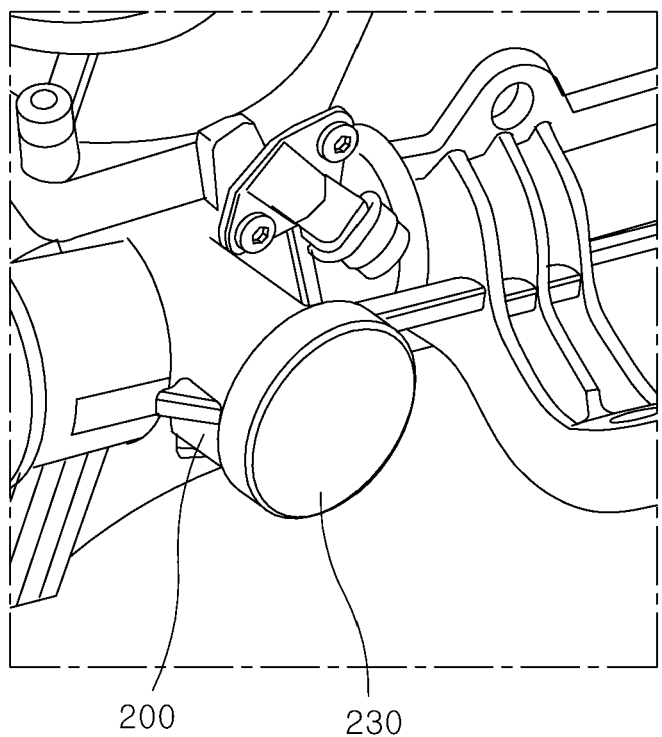
FIG. 2 is a partially enlarged view illustrating a mounting housing provided on the steering apparatus according to the embodiment of the present disclosure.
Figure 3:
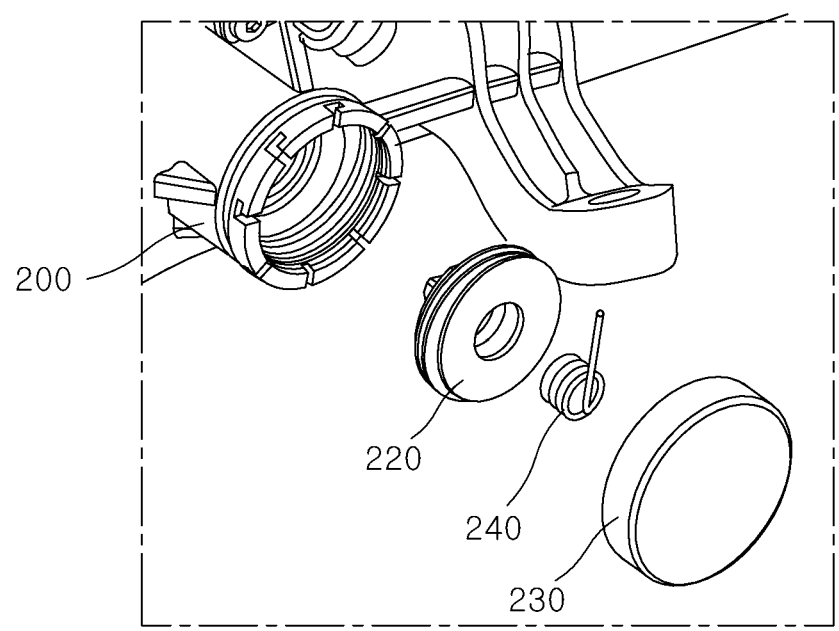
FIG. 3 is an exploded perspective view illustrating the mounting housing provided on the steering apparatus according to the embodiment of the present disclosure.

FIG. 1 is a perspective view illustrating a steering apparatus according to an embodiment of the present disclosure. FIG. 2 is a partially enlarged view illustrating a mounting housing provided on the steering apparatus according to the embodiment of the present disclosure. FIG. 3 is an exploded perspective view illustrating the mounting housing provided on the steering apparatus according to the embodiment of the present disclosure.

Figure 4:
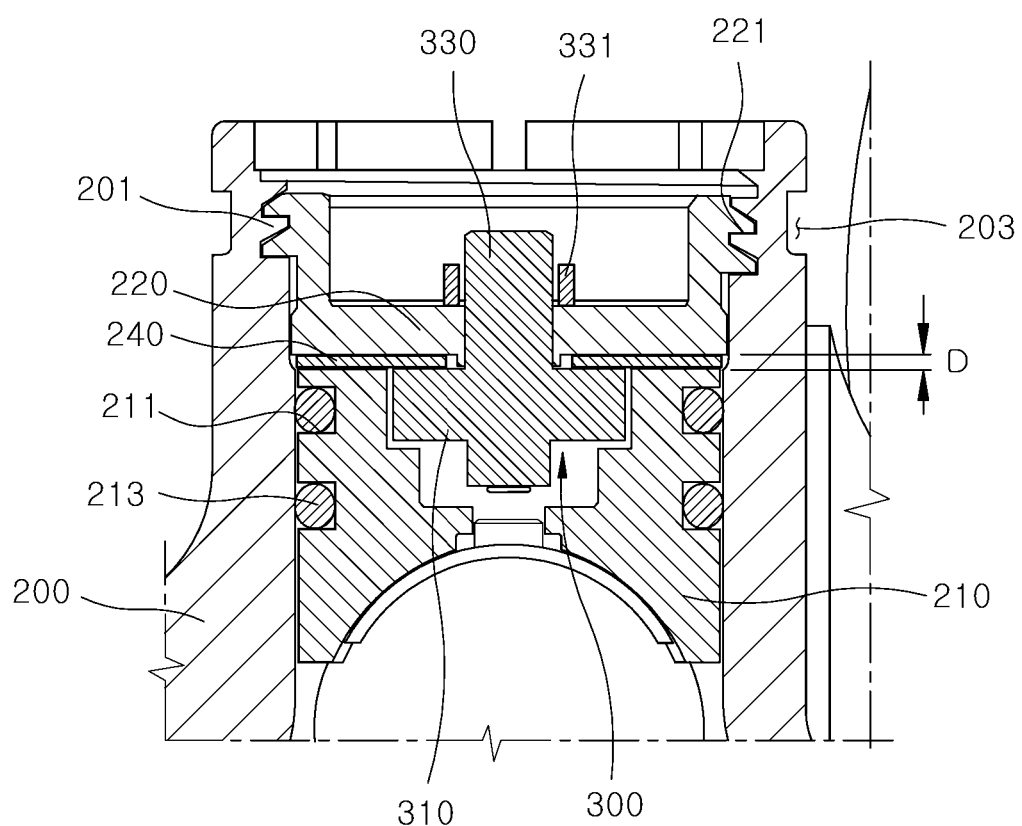
FIG. 4 is a sectional view illustrating the inside of the mounting housing provided on the steering apparatus according to the embodiment of the present disclosure.
Figure 5:
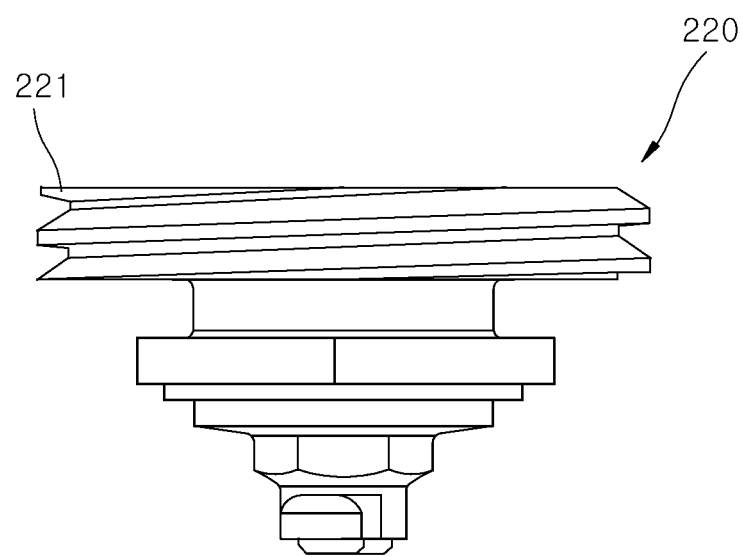
FIG. 5 is a sectional view illustrating a pressing member provided on the steering apparatus according to the embodiment of the present disclosure.
Figure 6:
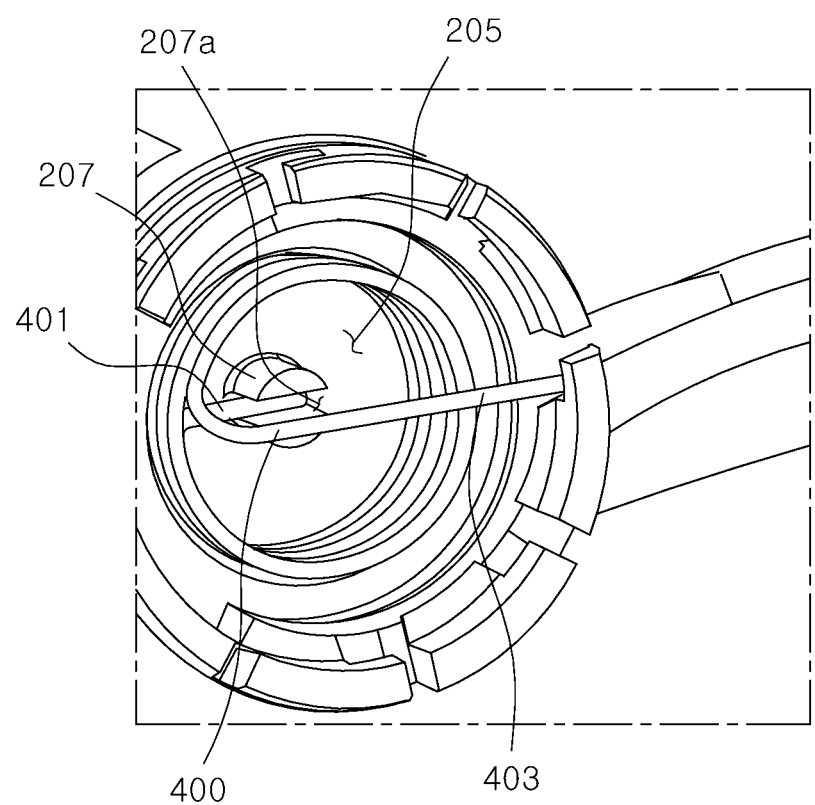
FIG. 6 is a partially enlarged view illustrating a state in which a torsion spring is provided in the mounting housing provided on the steering apparatus according to the embodiment of the present disclosure.
Figure 7:
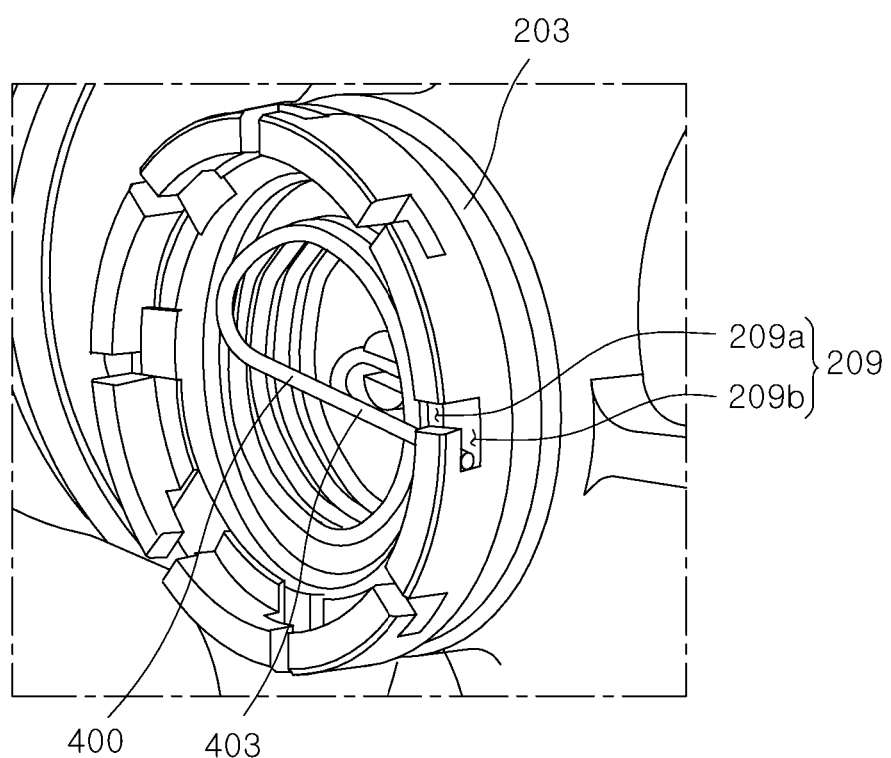
FIG. 7 is another partially enlarged view illustrating the state in which the torsion spring is provided in the mounting housing provided on the steering apparatus according to the embodiment of the present disclosure.
Figure 8:
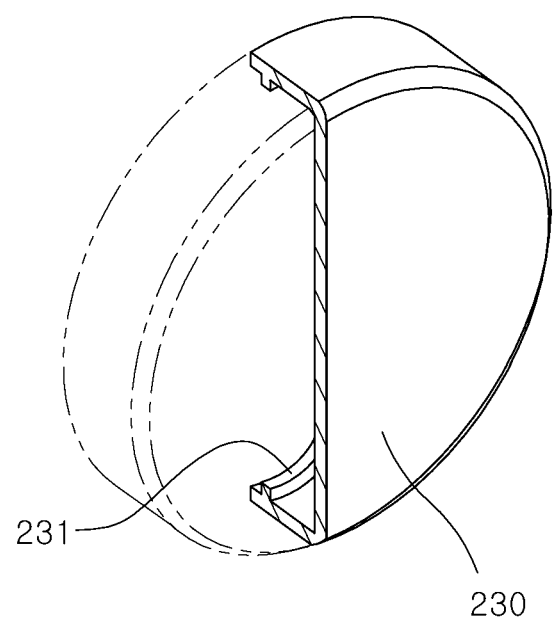
FIG. 8 is a rear view illustrating a cap member provided on the steering apparatus according to the embodiment of the present disclosure.

Further, FIG. 4 is a sectional view illustrating the inside of the mounting housing provided on the steering apparatus according to the embodiment of the present disclosure. FIG. 5 is a sectional view illustrating a pressing member provided on the steering apparatus according to the embodiment of the present disclosure. FIG. 6 is a partially enlarged view illustrating a state in which a torsion spring is provided in the mounting housing provided on the steering apparatus according to the embodiment of the present disclosure. FIG. 7 is another partially enlarged view illustrating the state in which the torsion spring is provided in the mounting housing provided on the steering apparatus according to the embodiment of the present disclosure. FIG. 8 is a rear view illustrating a cap member provided on the steering apparatus according to the embodiment of the present disclosure.

As illustrated in FIG. 1, a steering apparatus 100 according to an embodiment of the present disclosure includes a pinion shaft 110 that is connected with a steering wheel (not illustrated), a rack gear (not illustrated) that is provided on a rack bar 121 and is engaged with the pinion shaft 110, and so on.

In this case, the pinion shaft 110 is rotated along with the steering wheel, and a pinion gear (not illustrated) is installed at a portion that faces the rack bar 121.

The rack gear engaged with the pinion gear of the pinion shaft 110 is formed along one side of the rack bar 121, and the rack bar 121 moves inside a rack housing 120 while the rack gear is rotated in engagement with the pinion gear.

Meanwhile, as illustrated in FIGS. 2 to 5, the steering apparatus according to the embodiment of the present disclosure may include a mounting housing 200, a yoke body 210, and a pressing member 220.

The mounting housing 200 may be formed on one side of the rack housing 120 of a steering gearbox, and first threads 201 may be formed on an inner circumferential surface thereof.

The yoke body 210 may be provided inside the mounting housing 200 and support the rack bar 121 located inside the rack housing 120.

Here, at least one groove 211 may be formed in the yoke body 210 in a longitudinal direction, and elastic members 213 may be provided in the grooves 211.

The elastic members 213 may be fitted into the grooves 211 and fixedly support the yoke body 210.

In this case, the elastic members 213 may be formed of an O-ring.

The pressing member 220 may be located inside the mounting housing 200, and be assembled apart from the yoke body 210. A clearance D may be formed between the pressing member 220 and a clearance adjusting member 300, and a disc spring 240 may be provided between the pressing member 220 and the clearance adjusting member 300.

Further, second threads 221 may be formed on an outer circumferential surface of the pressing member 220. The second threads 221 may be coupled to the first threads 201, and thereby the pressing member 220 may be directly connected to the mounting housing 200 without using another separate configuration.

In addition, the pressing member 220 and the disc spring 240 may support the yoke body 210 in a state in which the second threads 221 of the pressing member 220 are coupled to the first threads 201, and may compensate for a generated clearance.

Meanwhile, an opening may be formed at one side of the mounting housing 200, and the pressing member 220 may be located to be exposed from the inside of the mounting housing 200 to the outside thereof through the opening.

Since the present disclosure directly couples the pressing member 220 to the mounting housing 200 without using a separate component such as a yoke plug, a structure of the steering apparatus is simplified, and the number of components to be used is reduced.

Further, since there is no separate component that blocks the mounting housing 200, the clearance D between the yoke body 210 and the pressing member 220 or between the pressing member 220 and the clearance adjusting member 300 can be easily adjusted while performance of a product is checked externally after the pressing member 220 is assembled.

Meanwhile, the clearance adjusting member 300 may be provided between the pressing member 220 and the yoke body 210.

The clearance adjusting member 300 may be located between the pressing member 220 and the yoke body 210, move toward or away from the pressing member 220 while rotating. Thereby, the clearance between the clearance adjusting member 300 and the pressing member 220 may be adjusted.

In this case, the disc spring 240 may be pressed by the set clearance D and assembled between the pressing member 220 and the clearance adjusting member 300, and press the yoke body 210 through a force of repulsion thereof.

To be specific, in a state in which one side of the clearance adjusting member 300 is assembled to have the clearance from the yoke body 210, the clearance adjusting member 300 may be rotatably coupled to the pressing member 220 with the other side thereof passing through the pressing member 220.

In this case, the fixed clearance D may be formed between the clearance adjusting member 300 and the pressing member 220, and the clearance may also be formed between the pressing member 220 and the yoke body 210.

If an accumulated tolerance occurs while constituent components are assembled, the clearance adjusting member 300 may be rotated to adjust the clearance by allowing the clearance adjusting member 300 to move toward or away from the pressing member 220.

Further, the clearance adjusting member 300 may be rotated to move the pressing member 220, thereby adjusting the clearance between the pressing member 220 and the yoke body 210.

Meanwhile, the clearance adjusting member 300 may include a movable section 310 and a body section 330.

The movable section 310 may be located in a direction of the yoke body 210, and move toward or away from the pressing member 220 by the rotation of the clearance adjusting member 300. Thereby, the clearance between the pressing member 220 and the clearance adjusting member 300 may be adjusted.

The body section 330 may be formed integrally with the movable section 310, and may be rotatably coupled to the pressing member 220 in a state in which it passes through the pressing member 220.

In this case, threads (not illustrated) are formed on an outer circumferential surface of the body section 330, and threads (not illustrated) are also formed on an inner circumferential surface of a through-hole (not illustrated) of the pressing member 220 through which the body section 330 passes. The threads are coupled, and thereby the body section 330 moves in the state in which it passes through the pressing member 220.

In addition, the outer circumferential surface of the body section 330 which is opposite to the movable section 310 and the pressing member 220 may be caulked. The set clearance between the clearance adjusting member 300 and the pressing member 220 or between the pressing member 220 and the yoke body 210 may be fixed through the caulking.

Further, a nut 331 may be coupled on one side of the body section 330 which is opposite to the clearance adjusting member 300. The set clearance between the clearance adjusting member 300 and the pressing member 220 may be fixed through the nut 331.

Meanwhile, as illustrated in FIGS. 6 to 8, a torsion spring 400 may be provided at the center of an upper end of the pressing member 220.

The torsion spring 400 may be located at the center of the upper end of the pressing member 220, and apply a rotational force to the pressing member 220.

Further, a seat 205 may be formed at the center of the upper end of the pressing member 220.

The seat 205 may be formed at the center of the upper end of the pressing member 220, and the torsion spring 400 may be seated thereon.

Therefore, the torsion spring 400 may apply a rotational force to the pressing member 220 in a state in which it is seated on the seat 205.

Further, a fixture 207 may be formed on the seat 205.

The fixture 207 may be located at the center of the seat 205, and one end 401 of the torsion spring 400 may be fitted into and fixed to the fixture 207. A fixing groove 207a may be formed in the fixture 207 such that the one end 401 of the torsion spring 400 may be fitted thereinto.

In addition, fitting recesses 209 may be formed in the mounting housing 200.

The fitting recesses 209 may be formed along a circumference of the mounting housing 200, and the other end 403 of the torsion spring 400 may be fitted into and fixed to the fitting recess 209.

Therefore, the torsion spring 400 may provide a rotational force to the pressing member 220 in a state in which the one end 401 thereof is fitted into the fixture 207 and the other end 403 thereof is fitted into and fixed to the fitting recess 209.

Meanwhile, the fitting recess 209 may include an entry section 209*a* and a fitting section 209*b*.

The entry section 209*a* may be formed in a longitudinal direction of the mounting housing 200, and the other end 403 of the torsion spring 400 may be fitted thereinto.

The fitting section 209*b* may be bent to extend from the entry section 209*a* in a direction in which an elastic force of the torsion spring 400 is applied, and the other end 403 of the torsion spring 400 may be fitted into and fixed to the fitting section 209*b*.

That is, the other end 403 of the torsion spring 400 may be fitted into the pressing member 220 through the entry section 209*a*, and be fixed to the pressing member 220 through the fitting section 209*b*.

Further, a cap member 230 may be provided on the mounting housing 200.

The cap member 230 is fitted into the mounting housing 200 so as to close the opening of the mounting housing 200, prevents the mounting housing 200 from being opened to the outside, and prevents external foreign materials from being introduced toward the mounting housing 200.

Here, the cap member 230 may be formed of rubber or plastic.

Further, a cap member fitting groove 203 may be formed in the mounting housing 200.

The cap member fitting groove 203 may be formed along the outer circumferential surface of the mounting housing 200, and a fitting protrusion 231 may be fitted into the cap member fitting groove 203.

The fitting protrusion 231 may be formed on an inner circumferential surface of the cap member 230, and be fitted into the cap member fitting groove 203 when the cap member 230 is fitted into the mounting housing 200.

According to the present disclosure configured as described above, whole manufacturing cost is cut down by reducing the number of components used in the steering apparatus.

Further, the first threads 201 may be formed on the inner circumferential surface of the mounting housing 200, and the second threads 221 may be formed on the outer circumferential surface of the pressing member 220. The pressing member 220 may be moved through the coupling between the threads, thereby compensating for the clearance D caused due to wear after endurance.

Further, since there is no separate component that blocks the mounting housing 200, the clearance between the yoke body 210 and the pressing member 220 or between the pressing member 220 and the clearance adjusting member 300 may be easily adjusted while performance of a product is checked externally after the pressing member 220 is assembled.

Further, the accumulated tolerance that may be generated while the components are assembled may be reduced through the clearance adjustment.

Further, the seat 205 may be formed on the pressing member 220, and the fixture 207 may be formed on the seat 205. The torsion spring 400 may stably provide a rotational force to the pressing member 220 in the state in which the torsion spring 400 is fixed to the fixture 207.

Further, the fitting recesses 209 may be formed in the mounting housing 200, and the torsion spring 400 may be fitted into and fixed to the fitting recess 209. Thereby, the elastic force of the torsion spring 400 may be stably applied to the pressing member 220.

The cap member 230 may be fitted into the opened portion of the mounting housing 200, and thereby external foreign materials may be prevented from being introduced into the mounting housing 200.

Although a preferred embodiment of the disclosure has been disclosed above, it is clear that the disclosure may use various changes, alternations, and equivalents and properly modify and equally apply the embodiment. Thus, the contents do not limit the scope of the disclosure defined by the following claims.

What is claimed is:

1. A steering apparatus comprising:
   an enclosure formed on one side of a rack housing and having first threads formed on an inner circumferential surface of the enclosure;
   a body provided inside the enclosure to support a rack bar located inside the rack housing;
   a first member disposed inside the enclosure having second threads formed on an outer circumferential surface of the first member, and being coupled to the enclosure with the second threads being coupled to the first threads and wherein the first member is separated from the body;
   a biasing member disposed at an upper end of the first member to apply a rotational force thereto;
   a seat centered at the upper end of the first member to seat the biasing member on the seat; and
   fitting recesses formed in the enclosure to fit and fix a first end of the biasing member, respectively, into and to one of the fitting recesses along a circumference of the enclosure.

2. The steering apparatus according to claim 1, further comprising:
   an opening formed at one side of the enclosure; and
   the first member exposed from the inside of the enclosure to the outside thereof through the opening.

3. The steering apparatus according to claim 2, wherein the enclosure comprises a mounting housing and the steering apparatus further includes a cap member coupled to the mounting housing to close the opening.

4. The steering apparatus according to claim 3, further comprising:
   a cap member fitting groove formed along an outer circumferential surface of the mounting housing; and
   a fitting protrusion formed on an inner circumferential surface of the cap member to fit into the cap member fitting groove to couple the cap member to the mounting housing.

5. The steering apparatus according to claim 2, wherein the body comprises a yoke body and the first member comprises a pressing member and the steering apparatus further comprises a clearance adjusting member disposed between the pressing member and the yoke body, the clearance adjusting member being movable toward or away from the pressing member to adjust a clearance therebetween.

6. The steering apparatus according to claim 5, wherein the clearance adjusting member comprises:
   a movable section located apart from the yoke body and movable toward or away from the pressing member; and
   a body section formed integrally with the movable section, and rotatably coupled to the pressing member such that the body section extends through the pressing member to move the movable section toward or away from the pressing member while rotating.

7. The steering apparatus according to claim 6, further comprising a caulked portion of an outer circumferential surface of the body section opposite to the movable section at one surface of the pressing member.

8. The steering apparatus according to claim 6, further comprising a nut coupled to one side of the body section opposite to the movable section to fix the clearance adjusting member to the pressing member.

9. The steering apparatus according to claim 5, further comprising a disc spring between the pressing member and the clearance adjusting member.

10. The steering apparatus according to claim 1, further comprising a fixture on the seat to fit and fix a second end of the biasing member to the fixture.

11. The steering apparatus according to claim 1, wherein the biasing member includes a torsion spring, and each of the fitting recesses comprises:
   an entry section formed in a longitudinal direction of the enclosure, to receive the first end of the biasing member; and
   a bent fitting section extending from the entry section in a direction to apply an elastic force of the torsion spring to fit and fix the first end of the biasing member.

* * * * *